United States Patent [19]

Miller

[11] 3,937,887

[45] Feb. 10, 1976

[54] ACOUSTIC POWER SYSTEM

[75] Inventor: Francis A. Miller, Lawton, Okla.

[73] Assignee: Ben O. Key, Lawton, Okla.

[22] Filed: May 15, 1969

[21] Appl. No.: 824,791

[52] U.S. Cl. .................................... 179/1 F; 179/1 A

[51] Int. Cl.$^{2}$ .............................................. H04M 1/00

[58] Field of Search ............. 179/1 F, 1 FBS, 170.2, 179/1 A; 325/12

[56] References Cited

UNITED STATES PATENTS

| | | | |
|---|---|---|---|
| 3,047,661 | 7/1962 | Winker | 179/1 F |
| 3,118,972 | 1/1964 | Walczak | 179/1 F |
| 3,334,184 | 8/1967 | DeKoning | 179/1 F |
| 3,363,060 | 1/1968 | Grodinsky | 179/1 A |
| 3,365,545 | 1/1968 | Petrie | 179/1 F |
| 3,399,277 | 8/1968 | Davis et al. | 179/1 A |
| 3,431,358 | 3/1969 | Goncharoff | 179/1 F |
| 3,530,244 | 9/1970 | Reiffin | 179/1 |

FOREIGN PATENTS OR APPLICATIONS

| | | | |
|---|---|---|---|
| 659,066 | 10/1951 | United Kingdom | 179/1 F |

*Primary Examiner*—Ralph D. Blakeslee
*Attorney, Agent, or Firm*—Hubbard, Thurman, Turner & Tucker

[57] ABSTRACT

An acoustic power system includes a speaker which generates acoustic energy in response to electrical driving signals. Electrical representations of the acoustic energy generated by the speaker are effectively subtracted from electrical input signals having a preselected frequency response to produce electrical error signals. The error signals are amplified to produce the electrical driving signals which operate the speaker. In the preferred embodiment, the electrical representations of the acoustic energy generated by the speaker are produced by detecting a portion of the impedance produced across the speaker voice coil.

5 Claims, 3 Drawing Figures

INVENTOR

FRANCIS A. MILLER

Richards, Harris & Hubbard

ATTORNEY

INVENTOR:

FRANCIS A. MILLER

Richards, Harris & Hubbard

ATTORNEY

ACOUSTIC POWER SYSTEM

FIELD OF THE INVENTION

This invention relates to the generation of acoustic energy, and more particularly to a method and apparatus for producing a uniform acoustic output over a preselected frequency range in response to a linear input signal.

THE PRIOR ART

A great deal of work has heretofore been conducted in order to produce audio systems which generate acoustic energy having linear frequency responses, along with desirable acoustic fidelity characteristics. The majority of previous efforts in optimizing the reproduction of sound have been concerned with matching up a particular speaker system with a certain type and design of amplifier for use in a restricted acoustic environment. However, the quality of system performance varies with such matched amplifier-speaker systems if the speaker system or the acoustic environment is changed, as by mounting the speakers in a different type of speaker cabinet or by operating the speakers in rooms of various volumes and acoustic characteristics.

Moreover, the frequency response, distortion characteristics and power capabilities have often not been completely satisfactory in amplifier and speaker combinations optimumly matched according to prior art techniques. Additionally, with the use of conventional amplifying circuitry, the resulting acoustic output from speakers has often included uncorrected distortions caused by imperfect speaker diaphragms or cones and from undesirable standing waves which occur in some horn speakers.

SUMMARY OF THE INVENTION

In accordance with the present apparatus and method invention, an acoustic power system is provided wherein a transducer generates acoustic energy in response to electrical driving signals. Electrical representations of the acoustic energy produced by the transducer are compared with the system input signals to produce the electrical driving signals. The resulting acoustic energy is provided with preselected frequency and power characteristics even if the acoustic environment of the system is radically changed.

In accordance with another aspect of the invention, a speaker is provided for generation of acoustic energy in response to electrical driving signals. Circuitry senses the voltage impressed across the speaker for generation of electrical representations of the acoustic energy. A filter network produces electrical input signals having a preselected frequency response. Error signals are generated in response to the difference between the input signals and a proportion of the voltage across the speaker coil. Amplification circuitry is operable in dependence upon the error signals for generation of the electrical driving signals which operate the speaker.

In accordance with another aspect of the invention, a plurality of speakers each having different frequency characteristics are connected to circuitry which generate reference signals in response to the voltage across each of the speakers. A plurality of filter networks produce a plurality of input signals each having different frequency characteristics. Circuitry is associated with each of the speakers for effectively subtracting one of the reference signals from one of the input signals. An amplifier is associated with each of the speakers and is responsive to the output of the circuitry for producing driving signals for operation of the associated speaker.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENTS

Figure 1:
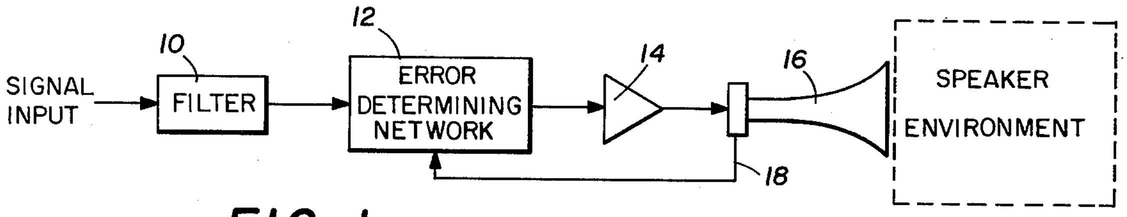
FIG. 1 is a block diagram of an embodiment of the basic system.

Referring to FIG. 1, a block diagram of the basic system according to the invention is illustrated. An electrical signal input is fed to a filter network 10 which produces a filtered input signal having a preselected frequency bandwidth. The signal input will generally have been preamplified and may be generated by any suitable source, such as a record turntable or an electrical musical instrument. The filtered input signal is fed to an error determining network 12 which generates an error signal in a manner to be later described. The error signal is fed to an amplifier circuit 14. The amplifier circuit 14 generates a driving signal which operates a suitable transducer 16, such as a conventional speaker, to produce acoustic energy to a speaker environment.

The characteristics of the speaker environment are dependent upon a large number of factors such as the construction and size of the speaker box, and the size, shape and acoustic properties of the room or area in which the speaker is located. As is well-known, the speaker environment plays an important part in the performance of conventional amplifier-speaker systems, but the performance of the present system may be made virtually independent of the speaker environment. The voltage across the voice coil of a speaker includes a voltage due to the motional impedance of the speaker which is a direct acoustic energy produced by the speaker 16. This voltage is fed via a lead 18 to an input of the error determining network 12 for comparison with the electrical input signals fed from the filter 10. The error signal generated by the network 12 is dependent upon the comparison between the two signals, as will be subsequently described in detail.

The system illustrated in FIG. 1 thus impresses voltage across the coil of the speaker 16 and compares a proportion of this with the input signals in order to generate a speaker driving signal. This technique tends to cancel out the variable characteristics of the speaker environment to produce an acoustic output closely approximating the input signal. This invention tends to cancel speaker distortions arising from undesirable standing waves in the speaker and the like. The system provides excellent distortion characteristics with higher power capabilities than previously developed systems. The system shown in FIG. 1 is especially adapted for use with transistorized circuitry, and provides improved performance at low signal levels without bass response loss.

Figure 2:
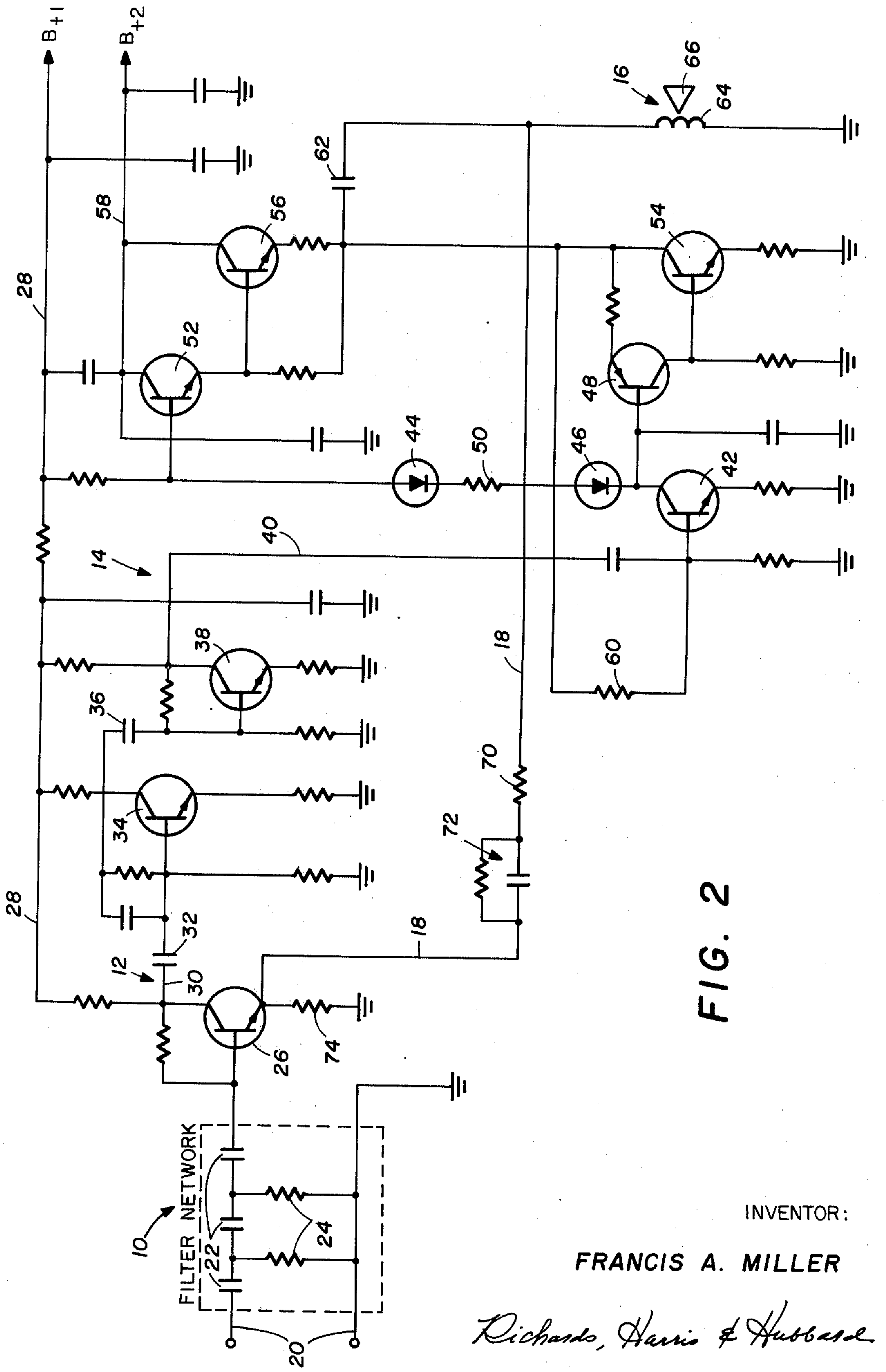
FIG. 2 is a schematic diagram of the system shown in FIG. 1.

FIG. 2 illustrates a preferred embodiment for the system shown in FIG. 1. The input signals are applied across terminals 20 and are fed through the filter network 10. Although the construction of the filter network 10 may be varied for different operating conditions, the network 10 illustrated in FIG. 2 comprises a conventional high pass R-C network comprising capacitors 22 and resistors 24. The resulting filtered input signals from network 10 are fed to the error determining network 12 which comprises in the preferred embodiment a NPN transistor 26. The emitter of transistor 26 is connected to lead 18 for reception of electrical representations of the acoustic energy produced by the speaker 16. The signal appearing on the collector of transistor 26 is representative of the difference between the signal appearing on lead 18 and the input signal fed to the base of transistor 26. The transistor 26 is conventionally biased via lead 28 from a suitable voltage source.

The error signal developed at the collector of transistor 26 is fed via lead 30 through a capacitor 32 to the base of a NPN transistor 34. As previously noted, this error signal is the remainder from the effective subtraction performed by the transistor 26 between the input signals and the signals appearing on lead 18. Transistor 34 is a first stage in the amplifier 14. The amplified signal is fed through the capacitor 36 to the base of a transistor 38. Suitable biasing resistor configurations are provided for each of the transistors 34 and 38 in the conventional manner. The output from transistor 38 is fed via lead 40 to the base of a transistor 42.

A pair of temperature senstive diodes 44 and 46 are connected in series between the collector of transistor 42 and the bias voltage lead 28. Diodes 44 and 46 provide voltage compensation for temperature-dependent variances of the circuitry. The collector of transistor 42 is also coupled to the base of a PNP transistor 48 and through diodes 44 and 46 and a resistor 50 to the base of a NPN transistor 52. The collector of transistor 48 is connected to the base of a NPN transistor 54, while the emitter of the transistor 52 is connected to the base of a like transistor 56. The collector of transistor 54 is coupled to the emitter of transistor 56 to form a conventional amplifier configuration. Bias voltage is supplied to the circuit via a lead 58 from a suitable voltage source. The base of the transistor 42 is connected through a resistor 60 to the collector of the transistor 54. The biasing circuitry of amplifier 14 is conventional and will not thus be discussed in detail.

The driving signal output of the amplifier 14 is fed through a capacitor 62 to the voice or speaker coil 64 of the speaker 16. Capacitor 62 operates as a cross-over network to limit low frequencies within the circuit. The term voice or speaker coil is utilized to designate the driving element of a speaker having a diaphragm or cone designated generally as 66. An example of a suitable speaker or transducer for use with the preferred embodiment of the invention is the horn speaker comprising the 806A driver and the 511B horn manufactured and sold by the Altec-Lansing Corporation. However, any suitable type of acoustic transducer could alternatively be utilized.

The preparation of voltage induced across the speaker coil which results from the motional impedance of the speaker system is directly related to the acoustic energy produced by the speaker and thus is representative of the instantaneous diaphragm or cone position of the speaker 16. The present invention directly detects the voltage across the speaker coil via lead 18 which is directly connected to the coil 64. The electrical voltage appearing on lead 18 is then representative of the acoustic energy produced by the speaker 16 and is fed through resistor 70 and an R-C network 72 substantially to the emitter of transistor 26. The R-C network 72 eliminates DC voltages within the circuit. The emitter of transistor 26 is connected to ground through a resistor 74. The ratio of the magnitudes of resistors 70 and 74 determines the percentage of the voltage across the coil which is fed to the emitter of the transistor 26. In the preferred embodiment of the invention, the ratio of resistors 70 and 74 is approximately 10:1, so that 1/10 of the magnitude of the voltage across the coil 64 is fed to the transistor 26. This porportion may be varied for various desired operating characteristics by controlling the magnitude of the resistor 70.

In operation, the voltage upon coil 64 is sensed to denote the present position of the diaphragm or cone of the speaker 16. The selected portion of the voltage is effectively subtracted from the input signal appearing at the base of transistor 26. An error signal proportioned to the difference is fed from the transistor 26 via lead 30 to the amplifier 14. The resulting driving signal generated by the output of the amplifier 14 is fed through the capacitor 62 to drive the speaker 16.

For optimum performance of the present invention, it is desirable to provide a relatively low damping factor, commonly termed "soft" operation, for the amplifier 14. It is also desirable for the amplifier 14 to have a relatively high output impedance to prevent shunting of the voltage across the coil 64 through the amplifier. A relatively high loop gain, preferably in the range of 750 to 800 $e_g$, is preferred for amplifier 14, along with the ability to deliver high instantaneous current with relatively low distortion. It is important in the invention to directly sense the voltage upon the coil 64, so that no phase lag is introduced into the detected signal by an intermediate circuit.

Figure 3:
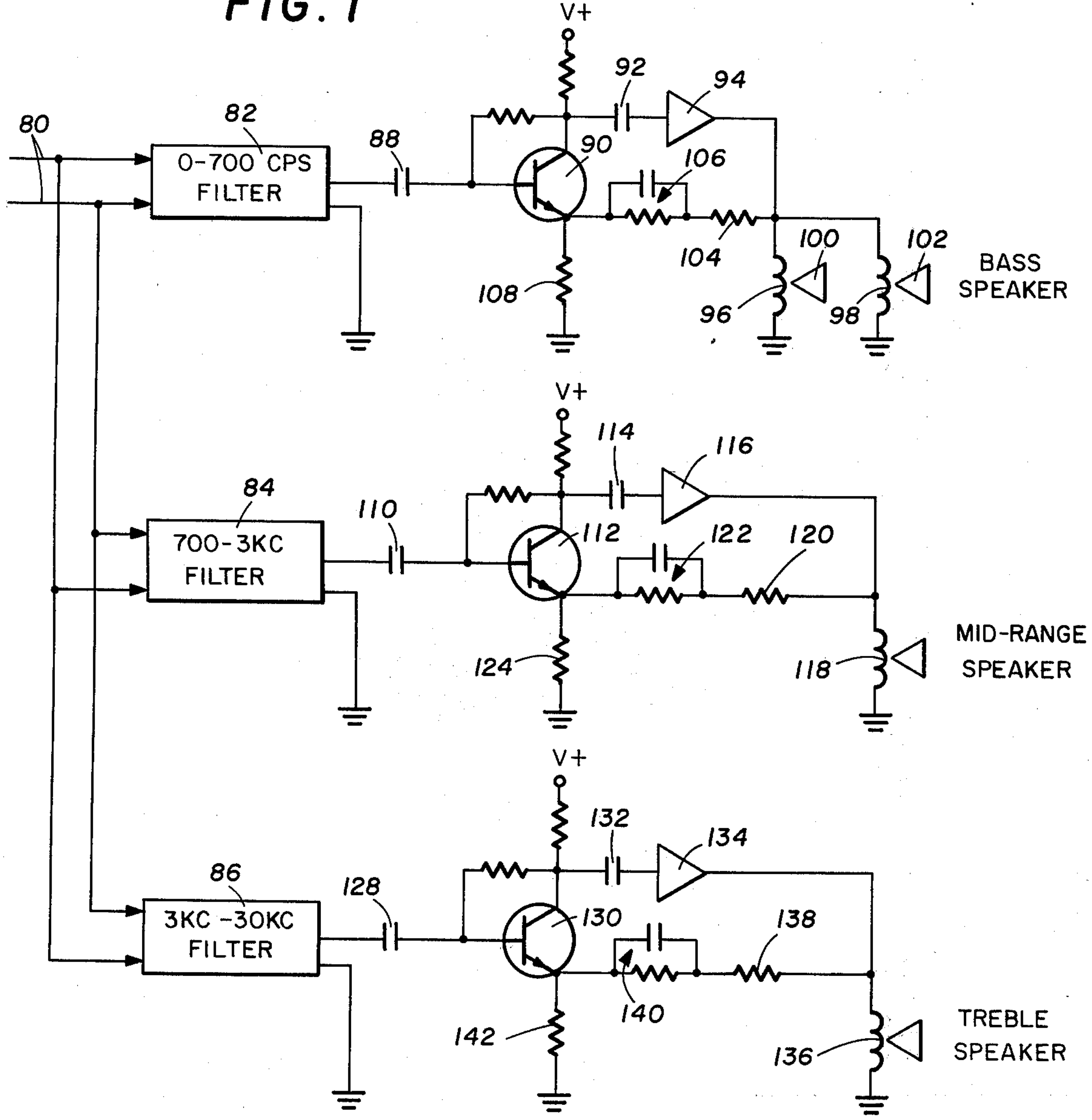
FIG. 3 is a block diagram of a multi-speaker configuration of the present invention.

FIG. 3 illustrates the use of the present invention in a wide frequency band system utilizing three frequency band channels. The pre-amplified input signals are fed via terminals 80 to filter networks 82, 84 and 86. Filter network 82 passes frequency within the bandpass of 0 to 700 cps, while filter networks 84 and 86, respectively, pass frequencies within the bandpasses of 700 cps - 3 kc and 3 kc – 30 kc. It will be understood that more or less filters which pass different bandwidths may be provided for other systems utilizing the present concept.

The filtered signals from the filter network 82 are fed through capacitor 88 to the base of the error determining transistor 90. In a like manner as that shown in FIG. 2, the collector of the transistor 90 is connected through a capacitor 92 to an amplifier 94 which generates a driving signal for voice or speaker coils 96 and 98 connected in parallel. Coils 96 and 98 respectively drive speaker diaphragms or cones 100 and 102 which are specifically constructed for optimum operation with base frequencies. The voltage induced upon coils 96 and 98 is sensed across the resistor 104 and is fed through the R-C network 106 to the emitter of transistor 90. The ratio between the resistor 104 and the resistor 108 determines the portion of the voltage across the coils which is effectively subtracted from the input signal by the transistor 90.

In a similar manner, the filtered input signals from the filter network 84 are fed through the capacitor 110 to the base of a transistor 112, the collector of which is connected through capacitor 114 to an amplifier 116. The output of the amplifier 116 provides driving signals for the midrange speaker coil 118. The voltage across the coil 118 is detected across the resistor 120 and is fed through the R-C network 122 to the emitter of the transistor 112. The ratio of the resistor 120 and resistor 124, which is connected between ground and the emitter of the transistor 112, determine the ratio of the voltage across the coil which is fed into the circuitry. The magnitudes of resistors 104 and 120 are not necessarily equal.

Likewise, the filtered output of the filter network 86 is fed through capacitor 128 to the base of a transistor 130. The collector of transistor 130 feeds error signals through a capacitor 132 to an amplifier 134. The output of amplifier 134 provides driving signals for a voice or speaker coil 136. The voltage on the coil 136 is detected by a resistor 138 and is fed through an R-C network 140 to the emitter of the transistor 130. A resistor 142 is connected between the emitter of transistor 130 and ground to control the ratio of the voltage on the coil 136 which is effectively subtracted from the input signal by the transistor 130.

In operation, each of the three frequency channels shown in FIG. 3 operate independently to generate very low distortion and flat frequency response acoustic outputs according to the invention.

Although in the preferred embodiment the electrical representations of the acoustic energy produced by the speakers has been determined by detection of the voltage on the speakers, it should be understood that various other methods are available for monitoring the acoustic energy output, or the diaphragm or cone position, of the speakers used in the invention. For instance, the vibratable cone of a conventional cone speaker may be attached to a piston member, or a wiper arm of a variable potentiometer, in order to provide a variable resistance which is proportional to the cone position of the speaker. Alternatively, a strain gauge may be attached to the vibrating cone or diaphragm of the speaker in order to give an analog electrical signal representative of the acoustic energy output of the speaker. Another alternate technique for use with the invention is the reflection of light from the vibrating speaker cone or diaphragm to a photocell which generates an output signal representative of the present cone or diaphragm position.

Although the present invention has been described with respect to specific embodiments thereof, it is to be understood that various changes and modifications may become apparent to one skilled in the art, and it is intended to encompass those changes and modifications as fall within the scope of the appended claims.

What is claimed is:

1. The amplifier and loudspeaker system comprising:

a loudspeaker having a voice coil for producing acoustic energy in response to a current applied thereto;

an amplifier having an input and an output and an output impedance of the same order-of-magnitude as that of the speaker;

a first capacitor coupling the output of the amplifier to the loudspeaker;

an input network comprising a transistor with collector, base and emitter bias resistors, the base of the transistor being the input and the collector being the output;

a second capacitor coupling the output of the input network to the input of the amplifier; and feedback means substantially capacitively coupling the terminal of the speaker to which the output of the amplifier is coupled to the emitter of the transistor of the input network.

2. The system of claim 1 wherein the amplifier includes an output stage having a pair of transistors connected between a voltage supply and ground, the emitter of one transistor being connected to the collector of the other transistor and forming the output of the amplifier.

3. The system of claim 1 wherein there are two loudspeakers each having a coil, and the coils are connected in parallel.

4. The system of claim 1 wherein:

there are a plurality of parallel channels each comprised of an input network, an amplifier, a loudspeaker and feedback means as set forth in claim 1; and each channel includes band-pass filter means at the input, the filter means being tuned to pass different frequency bands.

5. The system of claim 1 wherein the feedback means comprises a resistive-capacitive filter network wherein the signal is passed through a capacitive element.

* * * * *